US006533496B1

(12) United States Patent
Elliott

(10) Patent No.: US 6,533,496 B1
(45) Date of Patent: Mar. 18, 2003

(54) WATER CIRCULATION

(76) Inventor: Stephen Elliott, 47 Melaleuca Dr., Palm Beach Queensland (AU), 4221

( * ) Notice: Subject to any disclaimer, the term of this patent is extended or adjusted under 35 U.S.C. 154(b) by 0 days.

(21) Appl. No.: 09/763,232

(22) PCT Filed: Aug. 13, 1999

(86) PCT No.: PCT/AU99/00664

§ 371 (c)(1),
(2), (4) Date: Feb. 14, 2001

(87) PCT Pub. No.: WO00/09821

PCT Pub. Date: Feb. 24, 2000

(30) Foreign Application Priority Data

Aug. 14, 1998 (AU) .............................................. PP 5263

(51) Int. Cl.[7] ................................ F03B 5/00; C02F 7/00
(52) U.S. Cl. ........................ 405/80; 405/303; 210/170; 210/747
(58) Field of Search ............................. 405/79, 80, 81, 405/127, 303; 210/170, 747, 220

(56) References Cited

U.S. PATENT DOCUMENTS

| 3,640,514 | A | * | 2/1972 | Albritton | .................. | 210/242.2 |
|---|---|---|---|---|---|---|
| 3,852,384 | A | * | 12/1974 | Bearden | .................. | 210/242.2 |
| 4,030,859 | A | | 6/1977 | Henegar | | |
| 4,033,704 | A | | 7/1977 | Wadge et al. | | |
| 4,039,439 | A | * | 8/1977 | Clark | .......................... | 405/79 |
| 4,336,999 | A | | 6/1982 | Assaf | | |
| 5,104,589 | A | * | 4/1992 | Palmer et al. | ............ | 210/242.2 |
| 5,113,889 | A | | 5/1992 | McGuire, Jr. | | |
| 5,510,022 | A | * | 4/1996 | Mullis | ........................ | 210/170 |
| 5,549,828 | A | * | 8/1996 | Ehrlich | ....................... | 210/170 |
| 5,565,096 | A | * | 10/1996 | Phelan | ........................ | 210/170 |
| 6,032,931 | A | * | 3/2000 | Plunkett | ..................... | 210/220 |

FOREIGN PATENT DOCUMENTS

| DE | 37 03 562 C | 8/1988 |
|---|---|---|
| EP | 0 092 531 A2 | 10/1983 |
| FR | 2 718 732 A1 | 10/1995 |
| GB | 2 230 204 A | 10/1990 |

OTHER PUBLICATIONS

Derwent Abstract Accession No. 98–463556/40; JP 10–195934 A (Yoshida) Jul. 28, 1998.

Kirke et al. "Design and Model Tests for an Efficient Mechanical Circulator/Aerator for Lakes and Reservoirs" *Wat. Res.* 1997, pp. 1283–1290, vol. 31, No. 6, Pergamon Elsevier Science Ltd. Great Britain.

* cited by examiner

*Primary Examiner*—Frederick L. Lagman
(74) *Attorney, Agent, or Firm*—Leydig, Voit & Mayer Ltd.

(57) ABSTRACT

A water circulation apparatus for desratifying a body of water such as in a lake or reservoir is disclosed. Broadly, the apparatus (1) comprises ducting in the form of a draft tube (2) having an upper end (3) positioned towards the surface of the body of water and a lower end (4) positioned towards the bottom of the body of water, and a pump assembly (5) for pumping water through the tube (2). Broadly, the pump assembly (5) comprises an impeller (20) having six to fourteen blades (21) having a diameter of 3 m–5 m driven by an electrical motor. Typically, the apparatus (1) also includes a support in the form of a platform (13) mounted on buoyancy elements (12). Water enters the draft tube (2) through the upper end thereof and is pumped outwardly through the tube (2) and out through the outlet spaced above the bottom of the body of water. The apparatus is used to pump water across a thermocline which acts as a barrier to normal convection flow so as to destratify the body of water and to resist the occurrence of a layer of deoxygenated water near the bottom of the body of water.

29 Claims, 9 Drawing Sheets

WATER CIRCULATION

This invention relates to water circulation apparatus for destratifying a body of water and also to a method of circulating water.

This invention relates particularly to water circulation apparatus for destratifying a large body of stagnant water such as a dam, lake or water storage reservoir. It will therefore be convenient to describe the invention with reference to this example application. However, it is to be clearly understood that the invention is capable of broader application.

A large body of water such as a dam, lake or water storage reservoir is different to the ocean, and rivers in that it is not exposed to the same levels of mixing of the water. As a result, such bodies of water may be prone to stratification and lower regions of water can become anaerobic and/or anoxic. Typically, the problems arise during the summer months when the water near the surface becomes warmer than the lower regions of water, and as a result, the driving force for natural convection for circulation is not present.

As a result, the body of water tends to stratify into an upper warm layer known as the epilimnion and a deep colder layer the hypolimnion. The warm and cold layers are separated by a thermocline which acts as a barrier to normal convection flow. That is, natural convection occurs within each of the epilimnion and hypolimnion but not between the two. The result is a stratified body of water having relatively warm less dense oxygenated water near the surface and cold heavier deoxygenated water near the bottom of water. This problem does not occur during the winter months because the surface region of water becomes cooler than the deeper levels of water due to the cooler air and land temperatures which leads to this cooler water sinking and the deeper water rising. This process of natural convection tends to mix up the water and avoids stratification.

This stratification of water is undesirable because the colder anaerobic, anoxic layer towards the bottom of the body encourages the growth of toxic anaerobic organisms such as blue green algae. Further, it enables metal ions such as Mn, Fe, Ca, P and Cu to dissolve into the water where they act as a health hazard. For example, these metal ions can kill fish and other marine life and also render water unsuitable for use as domestic water. One way of addressing the problem is to treat water from such a stratified body of water prior to consumption to remove all the undesirable elements. However the economics and cost of doing this are clearly disadvantageous. Further, it does not address the underlying problem of avoiding the formation of stratification. It also does not address the damage caused to marine life and recreational swimmers by having harmful agents in the dam or lake in the first place.

One previous attempt to solve this problem involved introducing air bubbles into the body of water through diffusers positioned near the bottom of the reservoir. The idea was that the bubbles would oxygenate the lower levels of water and also encourage mixing and destratification of the body of water. However, the device was not effective and did not enjoy great success in overcoming the thermocline between the cold and warm layers of water. Further, the solution was expensive and unattractive commercially.

A large number of dams and water reservoirs around the country suffer from the problem outlined above and the problem has been widely recognised by municipal authorities and research workers. Clearly therefore any solution to this problem would be regarded as major breakthrough and would be highly advantageous to society generally.

According to one aspect of this invention, there is provided a water circulation apparatus for destratifying a body of water, the apparatus including: ducting having an upper end positioned towards the surface of the body of water and a lower end positioned towards the bottom of the body of water; and pumping means for pumping water through the ducting.

Thus, in use the apparatus enables water to be pumped across a thermocline so as to enable water from the epilimnion containing dissolved oxygen to enter the hypolimnion. The oxygen reacts with dissolved metal ions precipitating them out and also introduces oxygen into the water and warms the water. The ducting reduces energy losses associated with pumping water between the surface of the body of water and the bottom of body of water.

Typically, the apparatus further includes a support wherein both the pumping means and the ducting are mounted on the support.

The pumping means may be arranged to pump water downwardly through the ducting from the upper end thereof to the lower end. While this direction of water pumping through the ducting is preferred, water may also be pumped upwardly through the ducting.

Advantageously, the pumping means includes an impeller having six to fourteen blades, preferably six to ten blades, each having a free tip and projecting radially outwardly from a hub.

Thus, the impeller in many respects resembles a wind turbine. It has a large diameter and it has relatively few large blades. Naturally, it is beneficial that the blades be as light as possible. In one embodiment, the blades comprise aluminium coated with a carbon fibre coating. Naturally, the blades may also be made of a material such as a composite.

Preferably, the ducting and impeller each have a diameter greater than 2 meters, more preferably a diameter of 2 to 6 meters, most preferably 3 to 5 meters.

By having a diameter greater than 2 meters, a large volume of water can be pumped through the ducting. In addition, the larger diameter has the effect that the energy losses will be smaller than would have been the case through a smaller ducting.

Preferably, the ducting is a draft tube of flexible lightweight material open at both ends and which is capable of contraction in an axial direction.

Typically, the ducting is made of inexpensive sheet plastic, e.g. PVC plastic. This is advantageous as the ducting is large in both diameter and length and by using inexpensive material, the overall cost of the ducting is kept reasonable. Further, the flexible sheeting enables the ducting to be folded into a compact shape which can be easily carried about. Further, it enables the ducting to be easily hoisted out of the water and onto a support. The ability of the ducting to be capable of contraction or telescoping in an axial direction is important as it will be necessary to vary the length of the draft tube for different applications. This is accomplished by simply collapsing the flexible plastic in an axial direction.

Preferably, the draft tube has a substantially circular cylindrical configuration. A particularly preferred embodiment is circular cylindrical with a region which flares open towards the upper end thereof.

While a cylindrical tube naturally provides an efficient shape, other cross sectional shapes, e.g. rectangular, hexagonal and pentagonal are not excluded.

In another embodiment, the draft tube tapers outwardly towards each end thereof, e.g. with an hourglass configuration. Applicant believes that a more pronounced tapering such as with an hourglass configuration flaring towards both ends of the ducting will have the effect of further lowering friction losses through the tube and therefore produce even better results.

Optionally, the impeller may be located proximate to the upper end of the ducting. While the impeller is preferably located towards the upper end of the ducting for obvious reasons of convenience, it is to be appreciated that it may also be located in other positions in the ducting. For example, it may be spaced a distance, e.g. a short distance, below the upper end of the ducting inside the ducting. It may also be positioned about midway along the length of the ducting or even at the bottom of the ducting. Applicant prefers not to use a submersible pump and this can be easily accomplished if the impeller is placed towards the upper end of the tube.

According to another aspect of this invention, there is provided a method of destratifying a large body of water, the method including pumping water from one of an upper region of a body of water towards the surface thereof and a lower region of the body of water towards the bottom thereof, to the other of the upper and lower regions thereby to transport water across a thermocline in the body of water to thereby destratify the body of water, wherein the water is pumped through a draft tube from said one region to said other region.

Preferably, the water is pumped from the upper region to the lower region at a velocity less than 1 meter/second, preferably less than 0.6 meter/second, through the ducting having a diameter greater than 2 meters.

A water circulation apparatus for destratifying a large body of water such as found in a dam, lake or reservoir in accordance with this invention may manifest itself in a variety of forms. It will be convenient to hereinafter describe in detail several preferred embodiments of the above invention with reference to the annexed drawings. The purpose of providing this specific description is to instruct persons having an interest in the subject matter of the invention how to carry the invention into practical effect. It is to be clearly understood that the specific nature of this description does not supercede the generality of the preceding statements. In the drawings:

Figure 1:
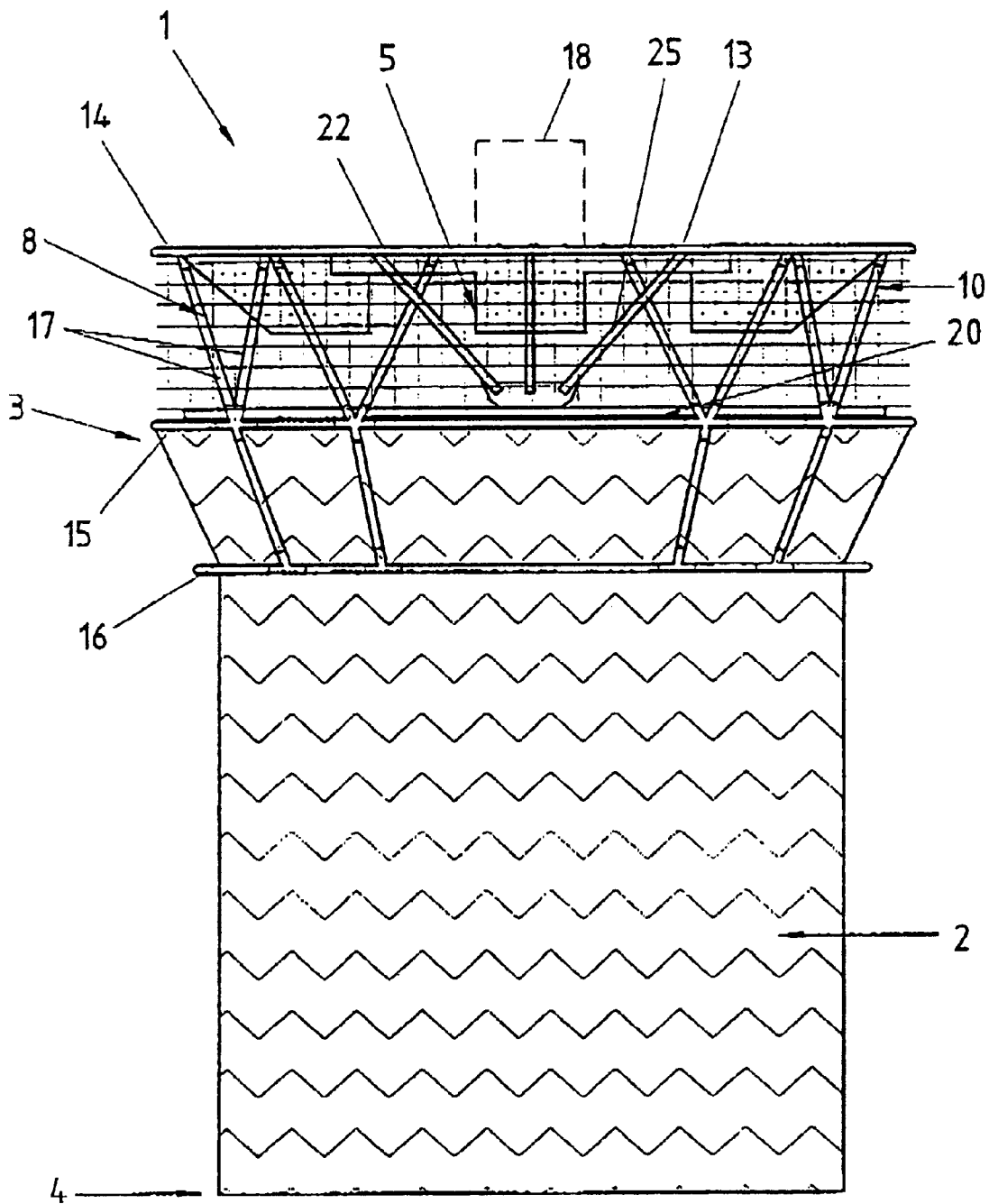
FIG. 1 is a schematic front view of water circulation apparatus in accordance with a first embodiment of the invention.

In FIG. 1, reference numeral 1 refers generally to a water circulation apparatus in accordance with the invention.

The apparatus 1 comprises broadly a ducting which is a draft tube 2 having an open upper end 3 and an open lower end 4, and a pump assembly 5 for pumping water through the draft tube 2 from the upper end 3 to the lower end 4. The apparatus 1 also includes a support which is a pontoon 8 for floating on a body of water and generally supporting the other components. The pump assembly 5 is mounted on top of the pontoon 8. The apparatus 1 also includes a frame 10 from which the draft tube 2 is suspended mounted on the underside of the pontoon 8.

The pontoon 8 comprises broadly four radially extending buoyant elements 12 and a working platform 13 mounted on the buoyant elements 12. Typically, the buoyant elements 12 are made from expanded foam, e.g. polystyrene, enclosed in an impervious lining or sheet, e.g. polypropylene. While these specific materials have found to be very suitable, it would be quite clear to persons skilled in the art that other materials could also be used.

The illustrated frame includes three vertically spaced circular members 14, 15, and 16 defining broadly a circular cylindrical configuration projecting beneath the pontoon 8 which are interconnected by a series of struts and braces 17. The lower circular member 16 has a smaller diameter than the other members 14 and 15 with the result that the lower region of the frame 10 tapers inwardly downwardly. The draft tube 2 is draped over the members 15 and 16 and the region of the tube between the member 15 and the member 16 forms a tapered entry zone or entry cone for the draft tube 2.

The members 14, 15 and 16 and straps and braces 17 are typically made of a relatively lightweight material, e.g. tubular aluminium.

The draft tube 2 is made of a lightweight flexible material, e.g. PVC sheeting. This confers the advantage that the tube 2 is lightweight and can be folded into a reasonably sized package for transport and portability. Further, the flexible nature of the material means that the length of the tube can be adjusted by collapsing or telescoping or concertinaing the draft tube 2.

The upper end 3 of the tube 2 is attached to the middle member 15 and the tube 2 covers the space between the members 15 and 16. This arranges the upper end 3 of the tube 2 in an open expanded position as described above. A variety of contrivances for attaching the draft tube to the frame will readily suggest themselves to persons skilled in the art. Therefore this detail will not be discussed in the specification.

The lower end 4 of the draft tube 2 has weight means in the form of a sausage or ring (not shown) for applying a tensioning or lengthening force to the draft tube. Further, the ring also provides the open lower end 4 of the tube 2 within an appropriate open shape to facilitate fluid flow therethrough.

The pump assembly 5 comprises broadly a drive, e.g. in the form of an electric motor 18, an impeller 20 having a plurality of radially extending blades 21, and a drive transmission arrangement including a drive shaft 22 operatively coupling the motor 18 to the impeller 20. Typically, the motor 18 is driven by a three phase electric mains supply although clearly there will be other ways of energising the pump. Applicant particularly has in mind the idea of using a solar generator mounted on the pontoon 8 for energising the impeller 20. Another option is a wind-powered generator.

Typically, the motor 18 is substantially centrally mounted on the platform of the pontoon and the impeller 20 is suspended spaced beneath the platform. A plurality of reinforcing struts 25, extend from the pontoon downwardly towards the impeller to support the drive shaft in a vertically extending position beneath the pontoon 8.

The impeller 20 typically has six to twelve blades 21. The angle of the blades 21 is adjustable. This is desirable so that the pitch of the blades can be flattened when the circulator is commissioned and there is a large amount of inertia, e.g. in the water to be overcome. Thereafter, the pitch of the blade may be adjusted, i.e. to reduce energy consumption during steady state operation of the apparatus.

In the illustrated embodiment, it is necessary to manually adjust the pitch, e.g. by using a diver when the blades are submerged under water. Alternatively, the blades may be adjusted on the platform by hoisting them out of the water. Applicant envisages including a control for conveniently adjusting blade pitch from the platform by an operator in its future embodiments.

Typically, the, blades are made of cast aluminium covered with carbon fibre. Clearly, the blade may also be made of composite material which produces the desired combination of low weight and high strength. In the illustrated embodiment, the impeller and draft tube have a diameter of 3 meters to 5 meters. The large diameter coupled with low velocity of water, e.g. 0.2 to 0.4 meters/sec through the tube enables a low specific power consumption and relatively high energy efficiency to be achieved when pumping the water through the tube 2.

In use, the apparatus 1 is installed in a dam, reservoir or the like. Typically, the apparatus 1 is installed in a fixed position in the lake although it may also be moved around at periodic intervals.

The components of the apparatus are designed to be easily transported to the dam and then easily assembled on site. For example, the draft tube can be conveniently folded up into a small package. Similarly, the space frame 10 is transported separated from the pontoon 8 before elements of the pontoon 8 are detached from each other for transport and then assembled on site. The apparatus is launched with the upper end 3 of the draft tube 2 attached to the pontoon 5 and the tube 2 packed in compact form. Once the apparatus is in the appropriate floated position in the lake then the lower end 4 of the draft tube 2 is lowered to provide the expanded draft tube suitable for use. The manner in which the draft tube is held open and in position during use is described in more detail below. The tube 2 will be positioned with its lower end 4 in the deeper regions of the body of water below the position of any thermocline which may exist.

The apparatus is commissioned by starting the pump. This causes the impeller 20 to rotate drawing water in through the openings in the side of the space frame 10 and then through the open top of the tube 2. The blades 21 then push the water down through the tube 2 and out through the lower end 4 thereof. The entry cone between members 15 and 16 assist in reducing frictional losses when water is fed into the tube 2.

Initially, a fairly large amount of energy is required to overcome the inertia in the water. To achieve this, the blades 21 are arranged in a flattened position. Later on, once steady state has been reached then the pitch of the blades 2 can be adjusted to adopt a steeper orientation, with a consequent reduction in energy consumption.

A large stratified body of water comprises an upper oxygenated warm layer called the epilimnion and a colder anaerobic lower layer called the hypolimnion. The epilimnion and hypolimnion are separated by a thermocline. The apparatus pumps relatively warm water from the epilimnion across the thermocline through the tube which assists in breaking down the stratification. Further as time progresses, the stratification radiates outwardly and occupies a progressively larger surface area of the body of the water. The introduction of the oxygenated water from the epilimnion into the hypolimnion exerts other positive effects. For example, the dissolved oxygen causes metal ions in solution in the hypolimnion to precipitate out as oxides. As these dissolved metal ions are toxic, this is highly advantageous. Secondly, it delivers toxic algae such as blue green algae down to the hypolimnion thereby resisting the blooming thereof which occurs in the epilimnion. It also oxygenates the water making it capable of supporting marine life.

Once the water has been substantially destratified, the energy required to continue circulating the water and thereby maintain it in a destratified condition is very low. This is because there is no density difference from top to bottom. The main energy loss at this stage is frictional loss where the fluid enters the draft tube. It would be possible at this point to switch the apparatus off. However, as the energy demands are very low, applicant believes that it is desirable that the apparatus run continually through the year.

The apparatus described above is commercially viable because it has a very low specific energy consumption, e.g. of the order of 0.1 $kW/m^3/sec$. Without being bound by theory, the applicant believes that this is due to the existence of the draft tube which reduces energy losses and enables the water to be efficiently transferred across the thermocline. Further, it is also due to the large diameter of the tube and impeller and also the low velocity at which the fluid is pumped through the tube. The velocity of water through the tube is of the order of 0.2 to 0.4 meters/second.

Figure 2:
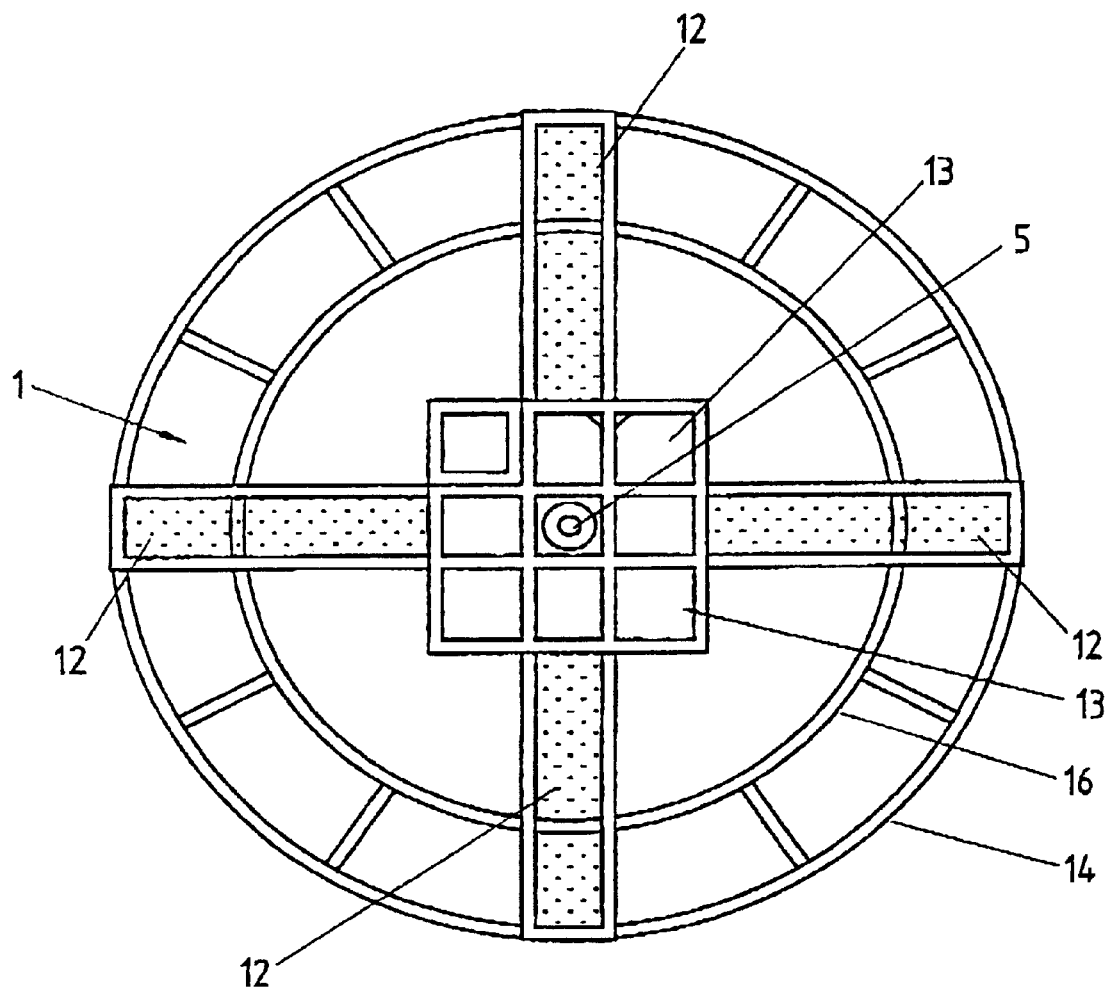
FIG. 2 is a schematic plan view of part of the apparatus of FIG. 1.
Figure 3:
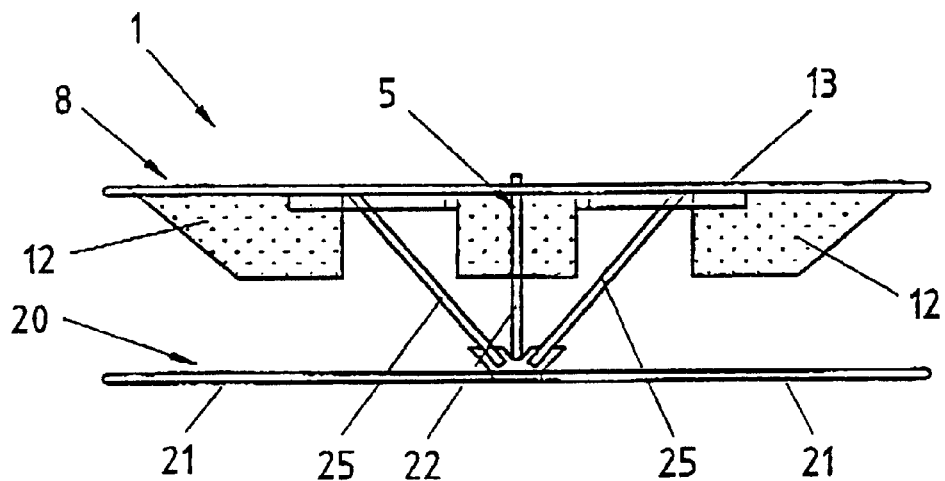
FIG. 3 is an exploded schematic front view of part of the apparatus of FIG. 1.
Figure 3:
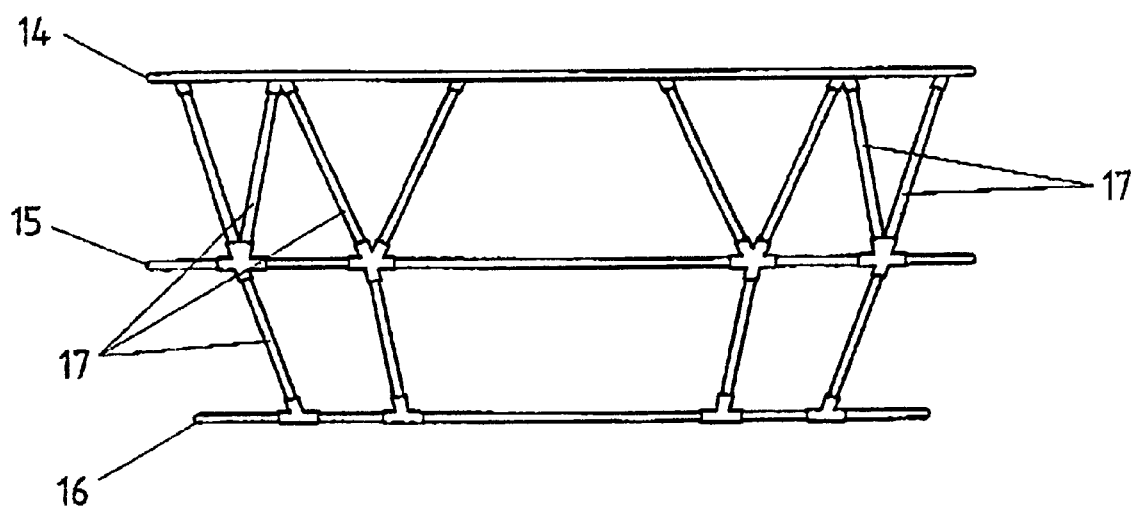

FIGS. 4 to 8 illustrate a water circulating apparatus in accordance with a second embodiment of the invention. This embodiment is structurally and functionally very similar to that illustrated in FIGS. 1 to 3. Accordingly, the same reference numerals shall be used to refer to the same components unless otherwise indicated.

The major differences between this embodiment and the previous embodiment are the structure of the frame extending downwardly beneath the pontoon, the feature of the winch which is used to suitably position the lower end of the tube, and the structural features of the draft tube.

Figure 4:
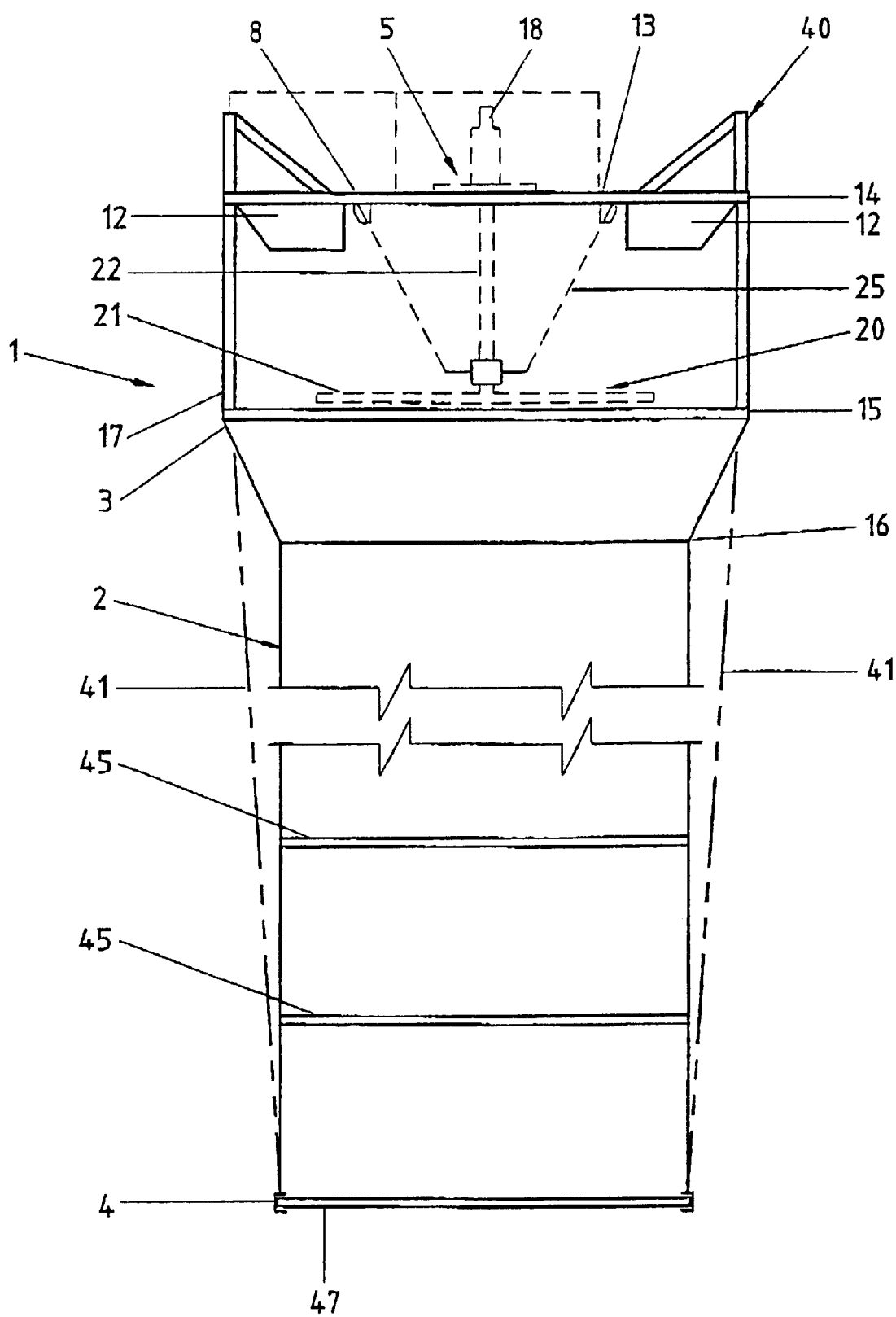
FIG. 4 is a schematic front view of an apparatus in accordance with a *second embodiment of the invention.

The frame 10 comprises three vertically spaced members which are circular rings 14, 15, 16, e.g. of tubular aluminium, mounted on four spaced transverse connecting members 17. The members 17 are typically spaced at 90° apart from each other. The rings 14 and 15 are slidably mounted on the members 17 so as to be of adjustable spacing relative to each other. This way, the spacing of the impeller 20 beneath the pontoon 8 can be adjusted. Further, the depth of the opening between the pontoon 8 and the upper end 3 of the draft tube 2 through which water is drawn into the tube 2 can be adjusted, As illustrated in FIG. 4, the length of the draft tube is controlled by means of a winch 40 mounted on the pontoon 8. The winch 40 has cables 41 passing over pulleys (not shown) and then extending downwardly to an anchor point at the lower end 4 of the tube 2. Thus, by appropriate rotation of the winch 40, the vertical position of the lower end 4 of the tube 2 can be raised or lowered. In the illustrated embodiment, there are two said winches 40 on the one side of the pontoon 8.

The illustrated draft tube 2 has circumferentially extending chains 45 attached thereto at spaced intervals along the length of the tube 2. The chains 45 aid in drawing out the tube 2 when it is suspended under water. A ring 47 is mounted to the lower end 4 of the tube 2 to appropriately weight it and also to hold it open so that the water can be appropriately discharged therethrough without a substantial drop in pressure.

Further, in the illustrated embodiment, the platform 13 is made of hardwood and is surrounded by a handrail. One of the buoyant elements 12 is covered to provide a walkway onto the platform.

Figure 5:
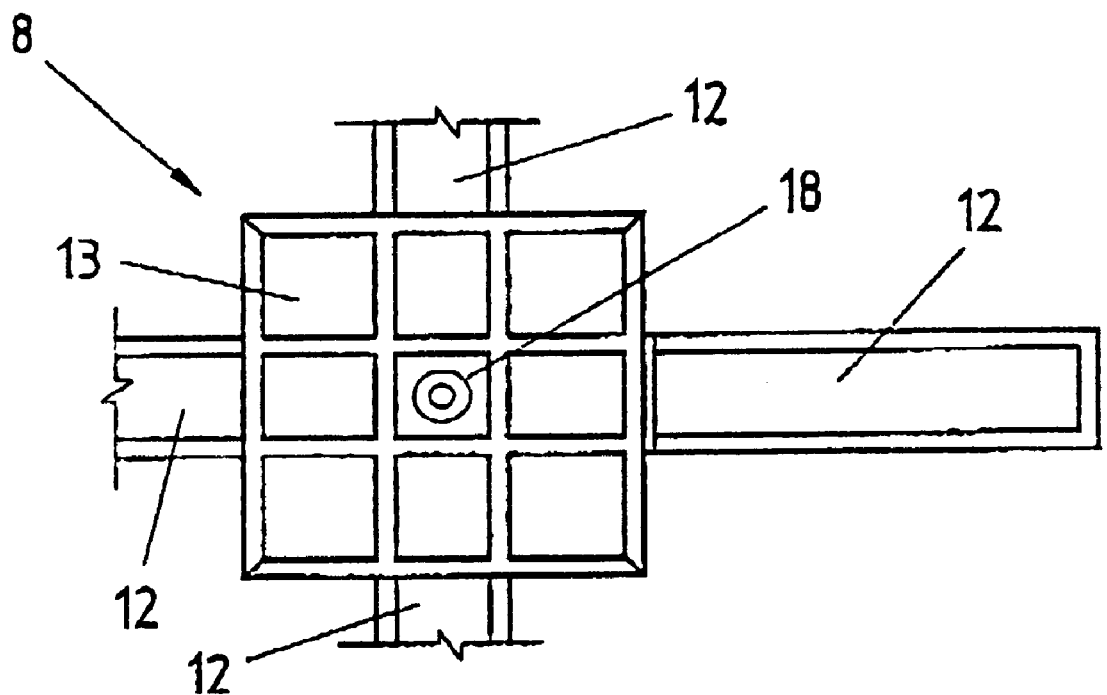
FIG. 5 is a top plan view of a pontoon of the apparatus of FIG. 4.
Figure 6:
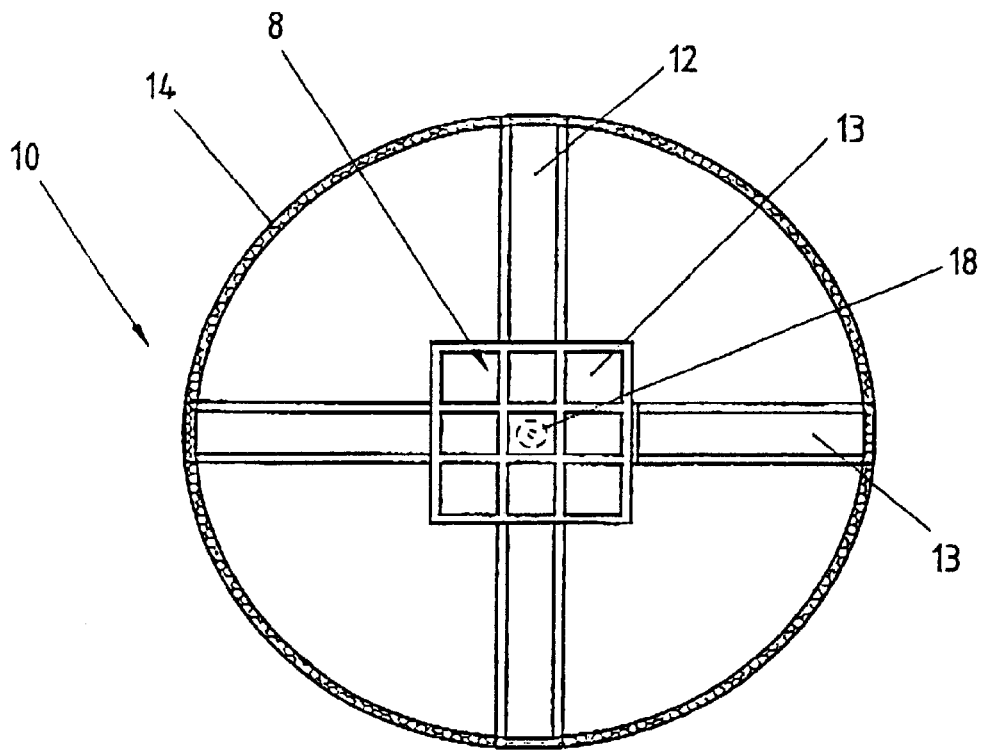
FIG. 6 is a schematic top plan view of an upper portion of a frame of the apparatus of FIG. 4.
Figure 7:
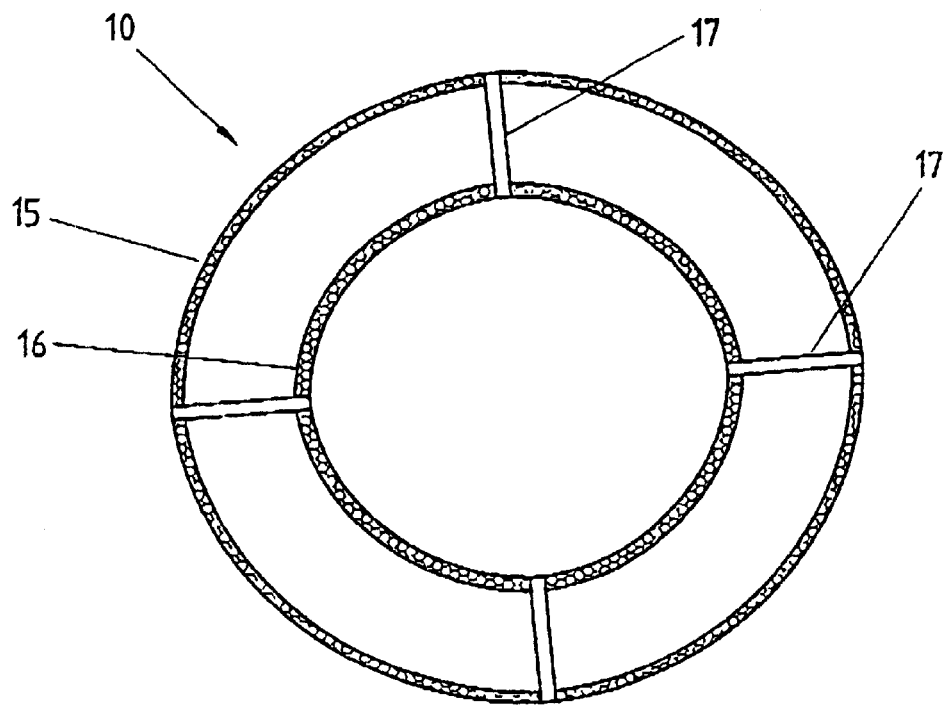
FIG. 7 is a schematic top plan view of a lower potion of the frame of the apparatus of FIG. 4.
Figure 8:
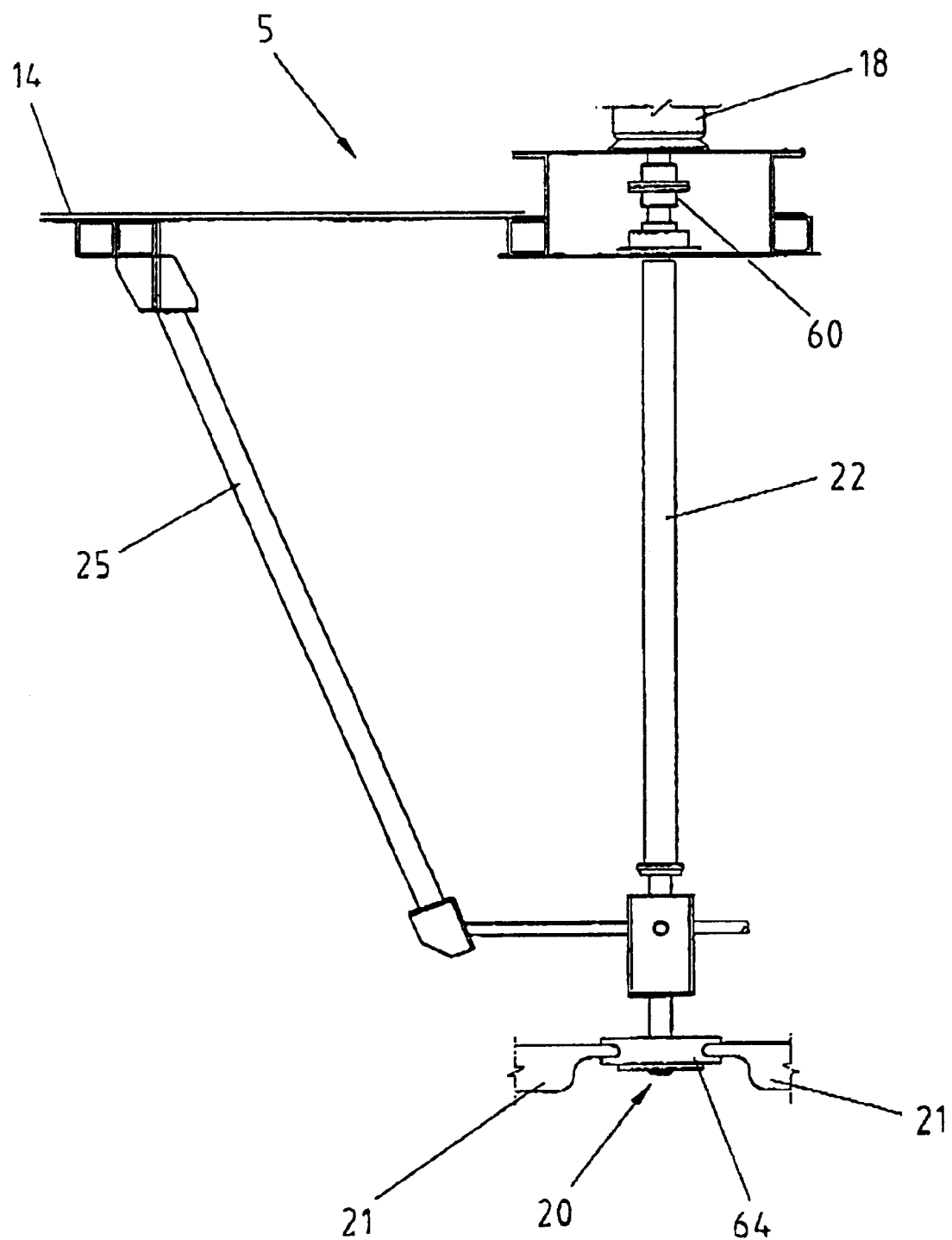
FIG. 8 is a front view of the pump assembly of the apparatus of FIG. 4.

FIG. 5 Illustrates in more detail the pump assembly of the apparatus of FIG. 4. In essence, the pump assembly 5 comprises a helically geared motor 18, a coupling 60, a hollow drive shaft 22 extending downwardly through the pontoon 8, and an impeller 20. The impeller 20 in turn comprises a hub 64 having a plurality of radially extending blades 21, e.g. eight blades. The blades 21 each terminate at a point closely spaced inwardly of the draft tube 2 to provide a small amount of clearance between the tips of the blades and the tube.

The distal end of the shaft 22 and the impeller 20 are held in a suitable vertically extending position by means of a plurality of struts 25 supporting a sleeve through which the shaft 22 is passed. Typically, the struts are made of tubular aluminium. In the illustrated embodiment, the drive shaft 22 is made of stainless steel.

Figure 9:
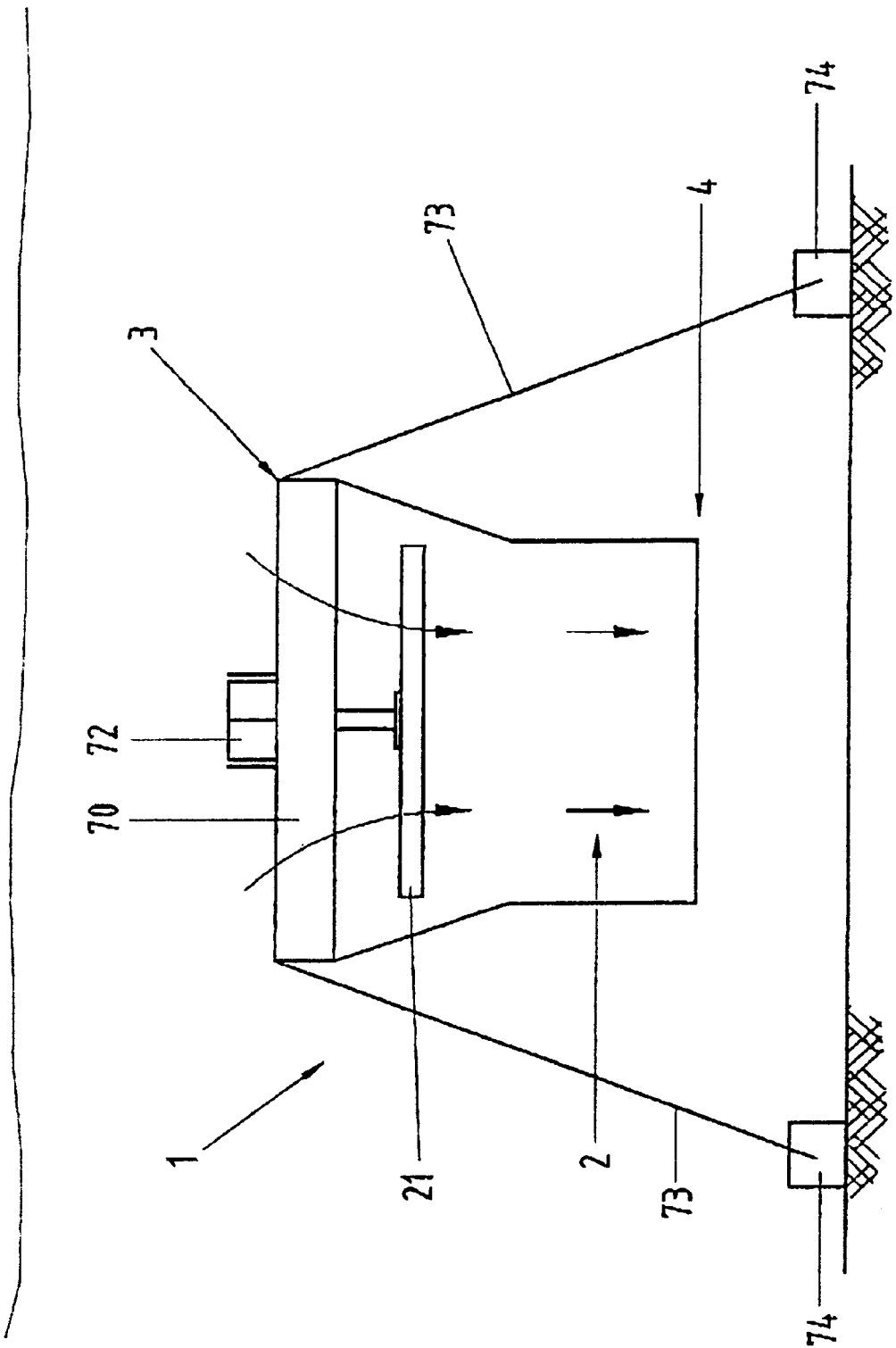
FIG. 9 is a schematic front view of apparatus in accordance with a third embodiment of the invention.

FIG. 9 illustrates a water circulating apparatus in accordance with a third embodiment of the invention. As with the second embodiment, the same references will be used to refer to the same components unless otherwise illustrated.

The main difference between the FIG. 9 embodiment and the FIG. 1 embodiment is that it does not include a pontoon. Rather, it has a support 70 which supports a submersible pump 72 and which is submerged underneath the water. Thus, while the support 70 and the submersible pump 72 and impeller 20 are close to the surface of the water, they are submerged beneath the water so as not to be prominently visible from the banks of the reservoir.

This embodiment tends to be used when it is desired to enhance the aesthetics of the lake, e.g. in a residential area, by positioning the apparatus out of sight to casual observers. While the support 2 does have some buoyant material so as to exert an upwardly directed or buoyant force on the draft tube 2 so as to draw it out, it is held spaced beneath the water surface by means of anchor cables 73. In the illustrated embodiment, the anchor cables 73 are fastened directly to the support 70 and an anchor element 74 on the floor. In an alternative embodiment, the anchor cables may be passed over pulleys having a counterweight on the free end thereof.

Figure 10:
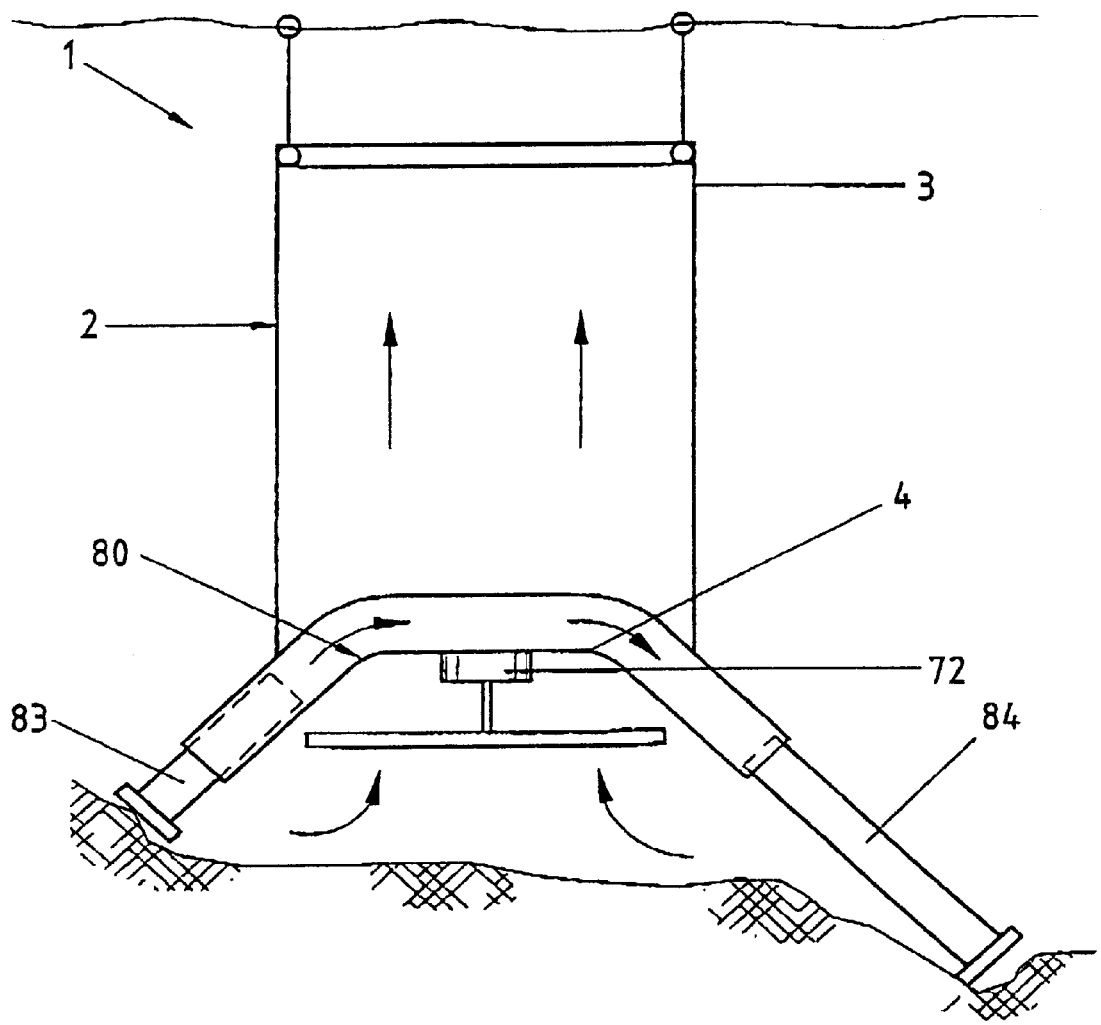
FIG. 10 is a schematic front view of apparatus in accordance with a fourth embodiment of the invention.

FIG. 10 illustrates a water circulating apparatus in accordance with a fourth embodiment of the invention. Again, in view of the structural similarities between this embodiment and the earlier embodiment, the same reference numerals will be used to refer to the same components unless otherwise illustrated.

The main difference between this embodiment and the FIG. 1 embodiment is that the lower end of the draft tube is held spaced above the floor of the body of the water by ground engaging members 80. These ground engaging members 81 are of variable length so as to be able to vary the height of the lower end 4 above the floor of the body of water and also to accommodate unevenness in the terrain of the floor of the body of water. The illustrated embodiment has a self-leveling mechanism 82. This mechanism comprises a hydraulic circuit with piston and cylinder assemblies 83 associated with each of two leg portions 84 to facilitate relative shortening and lengthening of the leg portions 84. As hydraulic mechanisms of this type would be well known to persons skilled in the art, they will not be described further in the specification.

In a yet further embodiment (not shown), the applicant has a solar generator mounted on the platform 30 for driving the pump assembly 5. That way, the apparatus 1 does not require a mains electrical supply to function and will run purely on solar energy collected by the solar generator and converted to electrical energy. Applicant believes that this embodiment will find particular appeal because it does not require a three phase electrical mains supply to be conducted to the platform, e.g. by means of an underground cable and a section of submarine cable. Typically, the solar generator will include electrical storage means for storing solar energy which has been generated and then enabling it to be used to drive the impeller at a later time.

Applicant has tested the apparatus illustrated in FIG. 4. The test results tend to show that this apparatus has been useful in addressing the problems addressed in the initial part of the specification.

The draft tube enables energy losses to be reduced when water is pumped downwardly from the epilimnion to the hypolimnion. Further, having the draft tube of large diameter assists in further reducing the energy losses. Further, by pumping the water through the tube at a low velocity, hydraulic frictional losses can be further lowered. These features enable commercial apparatus to be produced for destratifying a large body of water that is commercially feasible when previously this was not thought to be possible.

A further advantage of the apparatus described above with reference to FIG. 4 is that it has a relatively low capital cost. The draft tube having a diameter of 3–5 meters is a relatively large structure. However, by making it of relatively cheap plastics material, e.g. PVC, the capital cost of the equipment can be maintained at a reasonably low level. Further, the flexible lightweight nature of the PVC means that the draft tube can easily be packaged for transport and can also be readily lowered into and lifted out of the body of water. In fact, the apparatus readily lends itself to easy transport from a fabrication point to a remote dam or water reservoir site, It is also relatively easy to install it in a lake or reservoir and does not require sophisticated equipment to achieve this.

It will of course be realised that the above has been given only by way of illustrative example of the invention and that all such modifications and variations thereto as would be apparent to persons skilled in the art are deemed to fall within the broad scope and ambient of the invention as herein set forth.

What is claimed is:

1. Water circulation apparatus for destratifying a body of water, the apparatus including:
   ducting comprising of a draft tube of flexible material which is open at both ends and capable of contraction in an axial direction and has an upper end positioned towards the surface of the body of water and a lower end positioned towards the bottom of the body of water; and
   pumping means for pumping water downwardly through ducting from the upper end thereof to the lower end.

2. Water circulation apparatus according to claim 1, including a support, and wherein said pumping means is supported by said support and said ducting is suspended from said support.

3. Water circulation apparatus according to claim 2 wherein the pumping means includes an impeller including six to fourteen blades having free tips wherein each of the blades projects radially outwardly from a hub.

4. Apparatus according to claim 3 wherein the ducting and the impeller each have a diameter greater than 2 meters.

5. Water circulation apparatus according to claim 3 wherein the ducting and the impeller each have a diameter of 3–5 meters.

6. Water circulation apparatus according to claim 3 wherein the impeller is located proximate to the upper end of the ducting.

7. Water circulation apparatus according to claim 3 wherein said support has buoyancy means associated therewith.

8. Water circulation apparatus according to claim 7 wherein the support is a pontoon for floating on the surface of the body of water having a working platform, and wherein the impeller projects downwardly below the pontoon with its axis extending in a substantially vertical direction.

9. Water circulation apparatus according to claim 8 wherein the apparatus also includes an open frame projecting downwardly below the water to which the ducting is attached so as to provide form and shape to the upper end of the ducting.

10. Water circulation apparatus according to claim 3, including weighting means at the lower end of the ducting for making the lower end of the ducting heavier than water so that it tends to pull the ducting downwardly.

11. Water circulation apparatus according to claim 10, wherein the weighting means includes a rigid ring, which provides form and shape to the lower end of the ducting.

12. Water circulation apparatus according to claim 10, including further weighting means located at spaced intervals along the length of the ducting intermediate the ends of the ducting.

13. Water circulation apparatus according to claim 2, including means for adjusting the vertical position of the lower end of the ducting.

14. Water circulation apparatus according to claim 13 wherein the vertical position adjusting means includes at least one winch, which is operatively connected to the ducting so that by rotation of the winch, the vertical position of the ducting can be adjusted.

15. Water circulation apparatus according claim 2, including anchoring means for anchoring the support and/or ducting to a floor of a body of water.

16. Water circulation apparatus according to claim 15 wherein the anchoring means includes a plurality of flexible elements attached to respectively the floor and the support and/or ducting.

17. Water circulation apparatus according to claim 15 wherein the support includes buoyant material urging the support upwardly in the body of water and the anchoring means holds the support submerged beneath the water.

18. Water circulation apparatus according to claim 1, wherein the draft tube has a substantially circular cylindrical configuration.

19. Water circulation apparatus according to claim 18 wherein the draft tube having said substantially circular cylindrical configuration also has an entry cone or bell flared open towards the upper end.

20. Water circulation apparatus according to claim 1 wherein the draft tube tapers outwardly towards the bottom end thereof creating a diffuser.

21. Water circulation apparatus according to claim 1, including electrical energising means for driving the pumping means.

22. Water circulation apparatus according to claim 21 wherein the electrical energising means can be a solar generator.

23. Water circulation apparatus according to claim 22 wherein the solar generator is mounted on a pontoon and is thereby proximate to the pumping means and impeller which is to energise.

24. Water circulation apparatus according to claim 1, further including a ground engaging member extending from the lower end of the ducting to a floor of the body of water, to support said lower end of said ducting space above the floor.

25. Water circulation apparatus according to claim 1, wherein the ducting includes buoyant means proximate to the lower end thereof for urging the lower end of the ducting upwardly in the water, and anchor extending from a floor up to the lower end of the ducting to hold the ducting spaced above the floor.

26. A method of destratifying a large body of water, the method including pumping water downwardly from an upper region of a body of water towards a lower region of the body of water thereby to transport water across a thermocline in the body of water to thereby destratify the body of water, characterized in that the water is pumped through a ducting comprising a draft tube of flexible material which is open at both ends, said draft tube being capable of contraction in an axial direction.

27. A method of destratifying a large body of water according to claim 26, wherein the water is pumped at a velocity less than 1 meter/second through the ducting and wherein the ducting has a diameter greater than 2 meters.

28. A method of destratifying a large body of water according to claim 27 wherein the water is pumped at a velocity less than 0.5 meters/second through the draft tube and wherein the draft tube has a diameter of 3–5 meters.

29. A method of destratifying a large body of water according to claim 26 wherein the water is pumped by means of a pump having an impeller towards an upper end of the draft tube.

* * * * *